May 12, 1970     J. E. JONES ET AL     3,512,132

COMPOSING APPARATUS WITH TABLE LOOKUP MODE

Filed March 14, 1967     7 Sheets-Sheet 2

JUSTIFICATION LEVER

FIG. 6

SPACEBAR QUANTITY DIAL

SPACEBAR VALUE DIAL

FIG. 17

United States Patent Office 3,512,132
Patented May 12, 1970

3,512,132
COMPOSING APPARATUS WITH TABLE LOOKUP MODE
John E. Jones and Robert A. Rahenkamp, Lexington, Ky., assignors to International Business Machines Corporation, Armonk, N.Y., a corporation of New York
Filed Mar. 14, 1967, Ser. No. 623,024
Int. Cl. G06f 1/00, 7/00, 15/00
U.S. Cl. 340—172.5                                     23 Claims

ABSTRACT OF THE DISCLOSURE

The embodiment disclosed includes a composer printing device interconnected with apparatus for recording and reproducing digital signals on a magnetic record media. The apparatus is concerned with the automatic justification of printed lines of information on a document. Initially, a draft of one or more lines is prepared. Counting means is provided for keeping track of line remainders when the end zone of a line is reached. Upon termination of a line, circuitry is provided for looking up permanently recorded data stored in a convenient place, such as a predefined area on the record media, and according to the spaces in the line, to determine the redistribution of the line remainder increments over the word spaces in the line. Such information may be used immediately to produce a justified line or may be stored in conjunction with an individual line on the record media or in a separate storage facility for use at a later time.

CROSS REFERENCES TO RELATED APPLICATIONS AND PATENTS

The following patents and applications are of interest:

U.S. Pat. 2,919,002, L. E. Palmer, inventor; entitled "Selection Mechanism for a Single Printing Element Typewriter."

U.S. Pat. 3,082,854, F. E. Becker et al., inventors; entitled "Typewriter Input Checking Mechanism."

U.S. Pat. 3,222,460, N. J. Albanes et al., inventors; entitled "Multiple Station Selection System."

U.S. patent application Ser. No. 468,386, now U.S. Pat. 3,417,202 filed June 30, 1965, inventor R. A. Kolpek; assigned to the same assignee as the present application, and entitled "Recording Apparatus."

U.S. patent application Ser. No. 580,478, filed Sept. 19, 1966, inventors W. O. Cralle et al.; assigned to the same assignee as the present application, and entitled "Justification Data Calculator and Display Device."

U.S. patent application Ser. No. 623,022, J. E. Jones, R. A. Kolpek, and R. A. Rahenkamp, inventors; filed 1967 concurrently herewith; assigned to the same assignee as the present application, and entitled "Correlated Recording, Reproducing, Printing, and Composing Apparatus."

U.S. patent application Ser. No. 623,053, R. A. Kolpek, inventor; filed 1967 concurrently herewith; assigned to the same assignee as the present application, and entitled "Data System With Printing, Composing, Communication, and Magnetic Card Processing Facilities."

U.S. patent application Ser. No. 311,373, now U.S. Pat. 3,346,086, filed Sept. 25, 1963, W. O. Cralle et al. as inventors; and entitled "Proportional Escapement Apparatus for a Single Element Typewriter," with the same assignee as the present application.

OTHER REFERENCES

The following additional references are of interest:

IBM Customer Engineering Instruction Manual for the "Selectric"[1] Printer, Form Number 241–5032–2, dated January 1966.

[1] Trademark.

IBM Customer Engineering Manual of Instruction for "Selectric" Input/Output Keyboard Printer, Form Number 241–5159–2. Dated 1965.

IBM Customer Engineering Universal Reference Manual for "Selectric" Input/Output Keyboard Printer, Form Number 241–5182–0 dated June 30, 1963.

Certain equipment is also fully described in the

IBM Customer Engineering Manual "Dictation Equipment," Form Number 241–5071, revised Oct. 5, 1962.

IBM Dictation Equipment Reference Manual, Form Number 241–5132, dated Oct. 22, 1962.

IBM "Selectric" Composer Instruction Manual, Form Number 241–5340–0, Oct. 19, 1966.

BRIEF BACKGROUND OF THE INVENTION

Field

Broadly, the invention pertains to apparatus for producing justified printed matter from unjustified draft material. More particularly, the invention pertains to apparatus having storage facilities for recording and reproducing material to be printed, together with various logical and arithmetic facilities for determining justification factors for individual lines of printed matter. The invention has particular significance in an operator-oriented environment, that is, where an operator enters data into the system, controls the modes of operation of the system and maintains some measure of control over the finished justified printed copy resulting from operation of the system.

DESCRIPTION OF THE PRIOR ART

Numerous arrangements have been proposed in the prior art for producing justified printed matter. These arrangements have usually comprised some form of entry device for entering into the system data to be justified, and a separate output device for utilizing justified data. Intermediate the entry and output phases of the systems many diverse configurations have existed for producing justified copy. These have ranged from simple mechanisms and circuits to elaborate arithmetic and computational mechanisms and circuits that involve considerable hardware and programming. In many cases, some form of storage facility has been provided for storing rough copy data prior to, during, and after justification. The output of most prior art systems has been directed to photographic facilities that expose galley film in accordance with the justified data. Other systems have facilities for preparing perforated tape, or comparable media.

SUMMARY

The present invention contemplates the provision of facilities for producing justified printed matter from rough data entered by the operator of the equipment. Provision is made for the operator to manually justify the data entered, or to automatically justify the data, as desired. The structural configuration of the invention preferably comprises a printing composer with a keyboard for entering data, associated controls for establishing various modes of operation and with provision for printing a document manually and automatically in response to code signals. Associated with the printing composer unit is a data storage unit for recording rough copy data as it is entered by the operator and for reproducing the copy data subsequently in acordance with justification routines that are determined by a table look-up procedure. For convenience, a variety of justification factors are stored in a permanent location in the system.

In one mode of operation, referred to as a "Side by Side" column justification. the operator prepares rough draft copy in a left-hand column on a document and justified copy is automatically printed in a right-hand column on the document. The sequence involves a recording of the rough copy data on the record media as it is entered and printed in the left-hand column on the document. This is followed by a scan operation during which the table lookup factors are accessed and the amount of justification required is determined. A number of space value and long space quantity means are set at this time. Upon completion of the Scan and Justify operation, the equipment is automatically operative to reproduce the data that was previously stored to make use of the justification factors and to print justified copy in the right-hand column of the document.

In another mode of operation referred to as "Single Column" justification, the operator enters rough copy data for recording on the media and concurrent printing on the document. This is followed by a Scan mode during which factors in the table are accessed and the amount of justification required is determined and recorded on the media in terms of space values and long space quantity counts along with the rough copy data. No reproduction or actual justified printing of the data takes place until a plurality of lines has been recorded on the record media.

Accordingly, it is an object of the present invention to provide apparatus for producing justified printed matter visually and manually, or automatically, as selected by the operator.

Another object of the invention is to provide justification apparatus that is operator-oriented with provision for the operator to enter "rough copy" data into the system, to control modes of operation of the system and to receive printed justified results prepared by the system.

Still another object of the invention is to provide a justifying system in which the justification routines are performed with speed and efficiency, but involving a minimized amount of hardware.

In this connection, it is a further object of the invention to provide a justification system with consderable capabilities using available office products hardware with suitable modification.

Also, an object of the present invention is to provide a simplified table lookup facility for a justification system.

A still further object of the present invention is to provide a table lookup justification system that is operable to justify data on a Side by Side column basis or on a Single column basis, as desired. In either event, provision is made for storing the rough copy data entered by an operator prior to the justification routines.

Another object of the invention is to provide a justification system wherein justification information accessed from a table is stored in association with each of a plurality of categories of information, such as individual lines.

Another object of the invention is to provide a unitary table lookup justification system that receives rough copy data entered by an operator, that has provision for storing the copy data entered and for subsequently performing justification procedures with respect to the rough copy data, and for producing finally justified printed hard copy for the operator of the system.

Still another object of the present invention is to provide composing apparatus that is adaptable for various composing functions, including centering and flush right, flush left, flush right, or other combinations.

The foregoing and other objects, features, and advantages of the invention will be apparent from the following more particular description of the preferred embodiment of the invention as illustrated in the accompanying drawings.

DETAILED BACKGROUND OF INVENTION

Introduction

Figure 1:
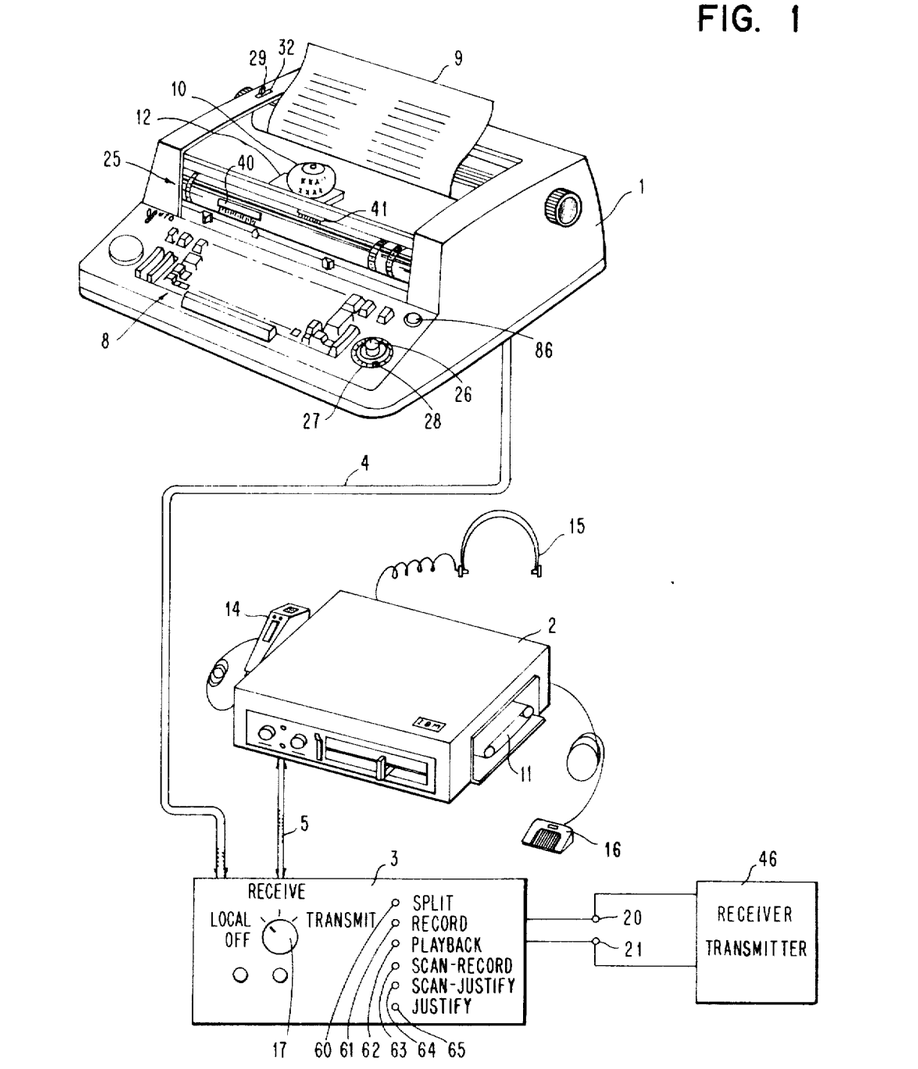
FIG. 1 is a system diagram that includes a printing composer, a recording-reproducing unit that may also be used for dictation and an associated control unit.
Figure 2:
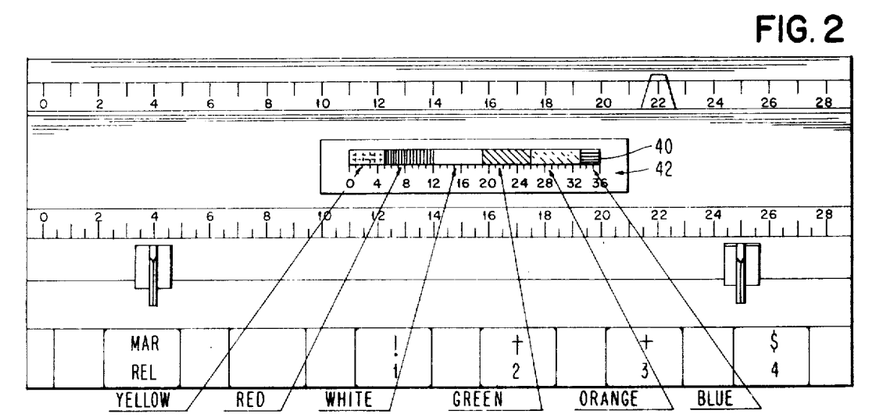
FIGS. 2, 3, and 4 illustrate a visual justifying arrangement that is used during manual justification procedures with the printing composer of FIG. 1.

An embodiment of the invention is illustrated in FIG. 1 and includes a printing composer unit 1 that is interconnected with a recording-reproducing unit 2 through a control unit 3 by cables 4 and 5. The apparatus has facilities for entering and printing data, for recording the data, for performing justification routines, and for printing justified data. Composer 1 has the usual keyboard 8 for entering data and performing functional actions in the composer unit. By depression of keys on keyboard 8, characters are printed on a document 9 by a single element print head 10. Document 9 is shown as having two Side by Side columns of printed information, the left-hand column constituting rough copy, and the right-hand column constituting justified copy according to the routines provided by the apparatus.

The recording-reproducing unit 2 has provision for recording and reproducing digital or audio signals stored in a magnetic record media 11, such as a magnetic belt.

The operation of the system including the establishment of the various modes required is controlled by a number of operator dials and switches on the composer unit 1, recording-reproducing unit 2, and control unit 3. When the Split button on control unit 3 is depressed, the composer unit 1 is effectively disconnected from the recording-reproducing unit 2, and each may be used independently of the other. In this mode, therefore, composer 1 is operated in a manual and visual mode of operation wherein the operator enters data into the composer, visually determines justification information for printed lines and thereafter operates the composer unit to produce justified lines as shown in the right-hand column on document 9.

During the Split mode, recording-reproducing unit 2 serves as a dictation unit and is controlled by means of a microphone 14 to record or reproduce dictated material. Subsequently, unit 2 can be used as a transcribing unit with a head set 15 and foot control 16.

Control unit 3 includes a number of other control buttons for establishing the desired modes of operation of the system. Of interest is a transmission knob 17 that is positioned in the local position in order for the system to be operated for justifying information by recording, justifying, and playback procedures. When knob 17 is positioned in the Reserve position, the system is operable to receive data over transmission lines 20 and 21 from a similar system or other data source. In the Transmit position of knob 17, data stored in the system of FIG. 1 is transmitted by lines 20 and 21 to another system of similar configuration, or an output device, such as a photographic unit, perforated tape unit, or magnetic storage unit, all possibilities being represented by block 46.

Composer unit

Only a brief summary of the structural configuration and operation of the composer unit 1, FIG. 1, is presented here since the details are available in the various references previously given, particularly the 1966 Cralle application and the Composer Instruction Manual, Form No. 241-5340. The composer unit, with its single element print head 10, is based on the basic printing principles disclosed in the Palmer and Becker patents as well as the various manuals on the "Selectric" printer and "Selectric" Input/Output. Generally print head 10 has all characters of a type font arranged on the periphery of the head. The head is rotated and tilted under control of various linkages described in the references in response to depression of a character key on the composer unit to select one of the characters for printing. Subsequently, the head is actuated against the document, such a document 9, to effect printing of the selected character. Documents positioned in the composer unit 1 are maintained in a relatively stable lateral condition, left to right, and print head 10 is escaped during printing and spacing adjacent document 9.

The composer unit makes use of a pin wheel memory for storing escapement values mechanically as typing proceeds for later use during the printing of the data as more particularly described in the 1963 Cralle application. The pin wheel memory described in the 1963 Cralle application is designated 30 in FIG. 7.

Manual and visual justification procedures

The manual and visual justification procedures are set forth in detail in the 1966 Cralle application and in the Composer Manual, Form 241-5340. To illustrate the utility of the present inventive arrangements, a brief summary of the justification procedures when performed manually and visually by an operator is presented below.

Primarily, the manual and visual justification procedures involve a data calculator and display device in the form of a justification indicator tube assembly 25, FIG. 1, a spacebar value dial 26, a spacebar quantity dial 27, and a justification lever 28, for establishing read and write modes of operation of the composer unit 1. The foregoing elements are shown in greater detail in FIGS. 2-6 and the spacebar dials are shown in some further detail in FIG. 9.

Several methods are available for doing justification work with the composer unit 1. The most common that is used is for the operator to type rough copy in the left-hand column on document 9 and to thereafter type the justified identical copy in the right-hand column on document 9. Thus, the material is typed in columns or galleys. The procedure involves the determination of the line remainder of any rough printed line in relation to a predetermined line length. The line remainder is then distributed over the interword spaces encountered in the line involved. As described in the various references, composer unit 1 has a variable spacebar mechanism that is settable to any value from 3 to 9 units. The range of 3-9 is indicated in connection with the spacebar value dial 26, particularly in FIGS. 5 and 6.

Figure 5:
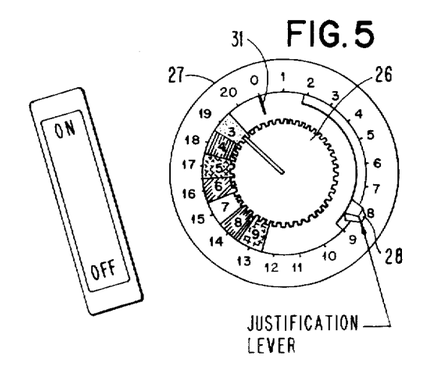
FIGS. 5 and 6 represent several settings of a number of dials for controlling the width of space increments during space operations in the printing composer of FIG. 1 as well as the number of long spaces (quantity) required.

During the typing of the rough line, the spacebar value dial 26 is set to "3" as shown in FIG. 5. The space bar quantity dial is set to a value of "0" indicated by the line 31, FIG. 5. The justification lever 28 is set in the clockwise position shown in FIG. 5 to establish a read mode of operation for composer unit 1.

A typical justification problem will illustrate the procedures for manual and visual justification. Consider a line of unjustified copy containing eight spacebar operations each having a 3 unit value. If it is assumed that the end of the printed copy falls 19 units short of the desired righthand margin of the copy, it is necessary to distribute the 19 units as evenly as possible throughout the eight spacebar operations. By increasing each of the eight spacebar operations by 2 units, a total of 16 units additional spacing is gained. A balance of 3 units remains. The 3 remaining units are distributed over the first three spacebar operations by increasing these spacebar increments from 5 units to 6 units, referred to as "long" spaces. To summarize, the first three spacebar operations have a 6 unit value and the five succeeding spacebar operations have a 5 unit value. This spreads the information in the rough copy sufficiently to reach the desired predetermined justified line length.

Initially, the operator selects a print head 10 having the desired type font. The escapement values for type fonts differ and the composer unit has a pitch selector lever 29 that is set to one of three color coded settings indicated on an associated dial 32 that corresponds with the color coding on the top of the selected print element 10. The indicator tube assembly 25 has three corresponding tube positions that are color coded. The operator matches the colors by rotating the tube assembly to the same color selected by lever 29. This positions one of a number of windows 40 or 41 for use by the operator in visually determining the justification data for each line during the printing procedure. As shown more clearly in FIGS. 2 and 4, a typical window opening, such as opening 40, has an associated indicator scale 42. Mounted for rotation within the external tube assembly 25 is an internal tube having a plurality of color bars positioned for viewing through the selected window 40. The internal tube is provided with twenty (20) different color bars, each related to a corresponding specific number of spacebar operations that may occur within any printed line, that is, up to twenty spacebar operations.

Figure 3:
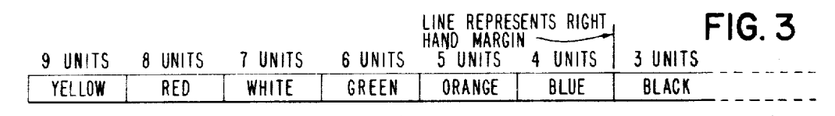

Each of the twenty color bars on the internal tube is selected as one of 6 colors, each representing a spacebar value as shown in FIG. 3. The initial 3 unit value is represented by black.

Figure 4:
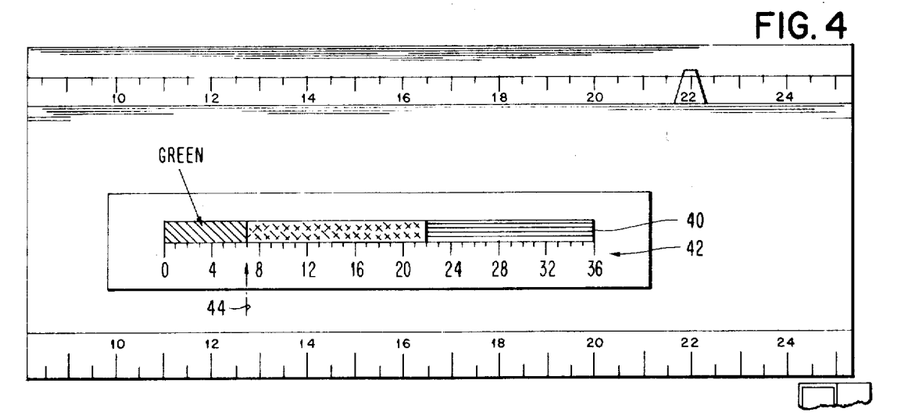

As the operator types the rough copy, and each time a spacebar operation occurs, the inner tube in the indicator assembly 25 is indexed one step of rotation. Each time the inner tube rotates, a different color appears at the extreme left of the selected window, such as window 40 in FIG. 2. As the print head 10 enters the justify zone for the line, it picks up the outside of the indicator assembly 25 and slides the tube laterally across the color bar that has been placed in the window. Also, a bell ringing advises the operator that she is approaching the right-hand margin. When printing has been terminated for the line in progress, the operator visually takes two readings from the indicator window 40. These are a color and a number. The color selected is the extreme left color that is showing upon termination of printing of the line. As indicated in FIG. 4, it is assumed that the color green is the color that finally appears at the left-end of window 40 and adjacent scale 42. The various colors on the inner tube are correlated with corresponding colors adjacent the spacebar value dial and indicate the spacebar unit value that is to be used during the justification typing of the line in question. The position at which the color selected, in this case green, terminates or extends along the indicator dial 42 determines the setting of the spacebar quantity dial. In the case illustrated, the green color extends to a value of "7" along dial 42, as more particularly indicated by the arrow 44, FIG. 4.

Figure 6:
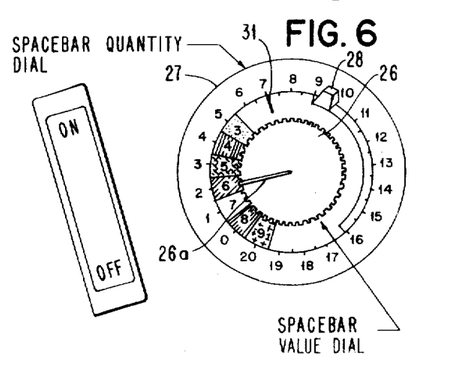

Following inspection of the window 40 and scale 42, the operator sets the dials 26 and 27, FIG. 6. The spacebar value dial 26 is rotated until the pointer 26a is opposite an incremental value of 6 indicated by the color green. The spacebar quantity dial 27 is rotated until the number 7 is opposite the indicator mark 31.

Following the setting of the value and quantity dials the operator again types the line in the right-hand column on document 9 and the spacebar operation is such that the remainder determined by the settings of the dials in FIG. 6 is distributed evenly throughout the spacebar operations and the line is justified. The spacebar value dial determines the units of space for each long spacebar operation, in this case, seven (7) spacebar operations as determined by the spacebar quantity dial. Each time a spacebar operation occurs during the printing of the line, the spacebar quantity dial is indexed or stepped toward "0." Therefore, seven spacebar operations will have a unit value of 6 units. As the spacebar quantity dial rotates from "1" to "0," the spacebar value dial is stepped down one position and thereafter indicates a spacebar unit value of "5." Accordingly, all of the rest of the spacebar operations in this particular line will have a unit value of 5.

It should be noted that the automatic operation of the value dial 26 and quantity dial 27 occurs when the justification lever 28 is moved to the counterclockwise position shown in FIG. 6.

To summarize, the justification lever 28 positioned clockwise as shown in FIG. 5, establishes a "read" mode during which the rough copy is typed, each spacebar operation has a value of "3" and the indicator tube assembly is operated in order to provide the operator with justification data for the line. When the justification lever 28 is moved counterclockwise to the position shown in FIG. 6, the composer unit is placed in a "write" mode during which the valve dial 26 and quantity dial 27 determine the incremental values of the spacebar operations in order to justify the line during the succeeding typing operation in the right-hand column.

Figure 9:
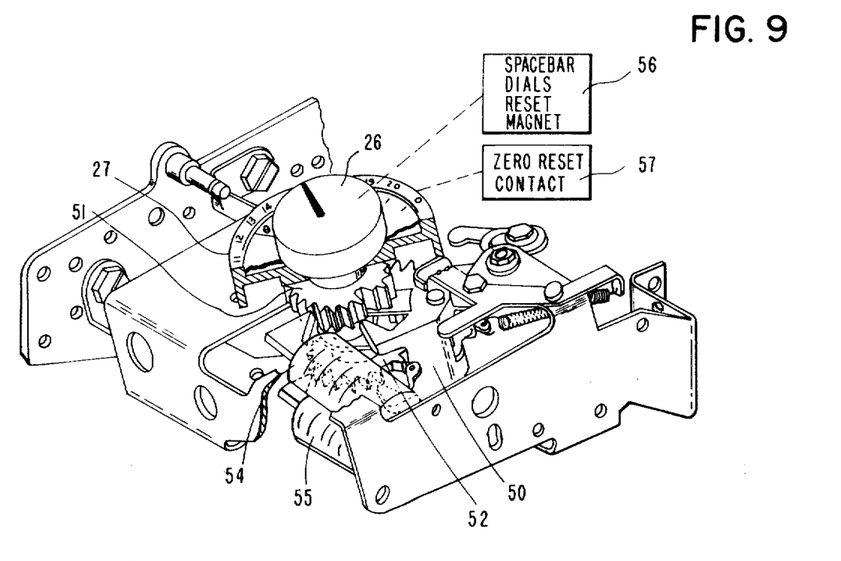
FIG. 9 is a partially cut-away view of the space value and quantity dials in FIGS. 5 and 6 together with associated mechanisms for moving the dials manually or automatically as required during justification procedures.

As more fully described in the 1966 Cralle et al., application, the pawl 50, FIG. 9, is operative to engage the quantity dial ratchet 51 to step it toward "0." When quantity dial 27 reaches "0," pawl 50 is automatically moved to engage the spacebar value ratchet 52 in order to step the spacebar value dial 26 by one increment as described in connection with FIG. 6.

Figure 14:
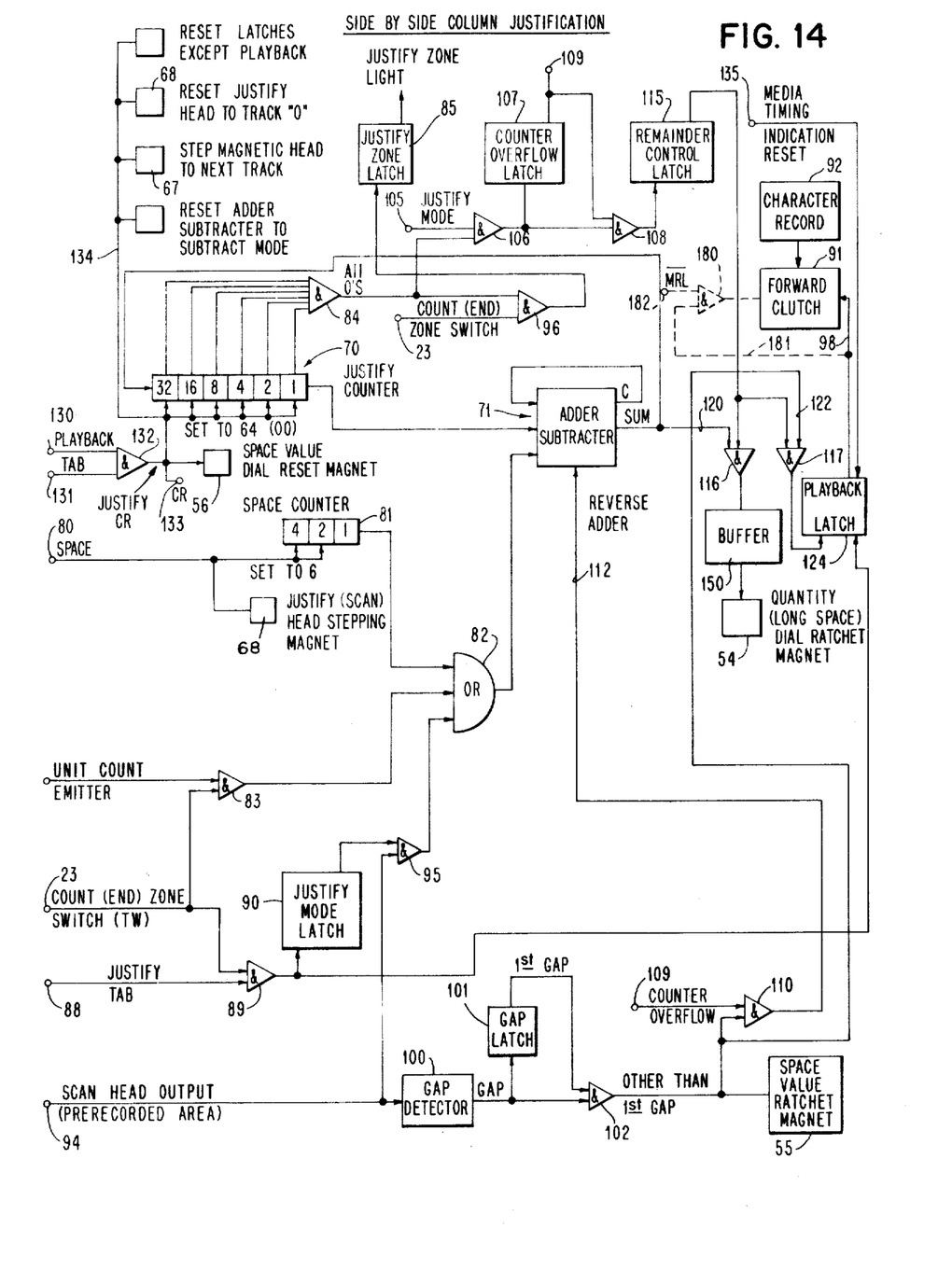
FIG. 14 shows a number of circuits, including counters and an adder-subtractor circuit for determining justification factors and controlling justification routines during a "Side by Side Column" Justification mode.

To facilitate the stepping of the dials automatically under control of the circuits in FIG. 14, a spacebar quantity magnet 54 and a spacebar value magnet 55 have been added to the assembly in FIG. 9. Also, a space value dial reset magnet 56 is provided for automatically resetting the space value dial to the minimum value of "3" units and the quantity dial to the "0" setting. The fact that the mechanism is reset in this fashion is indicated by a "zero reset" contact 57. Magnets 54 and 55 may be operated by a stepping circuit (comparable to a stepping switch operation) to reset the mechanisms rather than having a separate reset magnet.

Figures 7, 8:
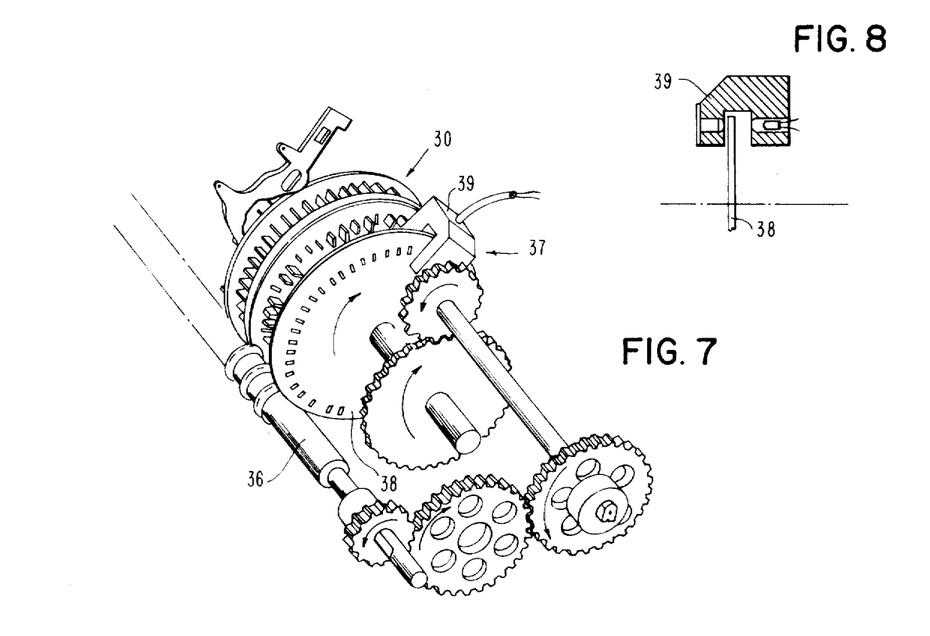
FIGS. 7 and 8 illustrate a modified escapement lead screw, pin wheel storage, and photosensing arrangement for storing escapement increments of individual characters during printing in the composer unit of FIG. 1 and for supplying indications of the increments stored.

During the typing of the justified version of the copy under control of the quantity and value dials, escapement values of the various characters are sensed as they were established in the pin wheel assembly 30 under control of the escapement lead screw 36, FIG. 7. For the auto- matic version disclosed herein, the photosensing assembly 37 with disc 38 and photocell assembly 39 is provided to supply escapement signals for operating counting and arithmetic justifying circuits in FIG. 14. The discs and photocell assemblies are shown in cross-section in FIG. 8.

Recording and reproducing apparatus

Reference is made to the Albanes patent, the 1965 Kolpek application, and the dictation equipment manuals previously noted for an earlier version of the recording-reproducing unit 2, FIG. 1. The 1965 Kolpek application describes the combination of a keyboard entry printer interconnected with a dictation unit for recording and reproducing digital signals. The digital signals are represented by trains of impulses that are recorded serially along tracks on a magnetic belt, such as belt 11, FIG. 1. The Kolpek apparatus includes a single recording-reproducing head assembly associated with a belt, such as magnetic belt 11, that is operable forwardly and reversely to record and reproduce information on the surface of the belt. The Kolpek apparatus has provision for splitting the printer and dictation unit so that each may be used independently as well as for transmitting and receiving information between two operating stations.

To accomplish the automatic justification and table lookup procedures presented herein, control unit 3, FIG. 1, is modified to include control buttons designated Split, Record, Playback, Scan-Record, Scan-Justify, and Justify. These control buttons are designated 60–65 in FIG. 1.

The mechanisms for moving belt 11 and for driving and stepping the transducer head in the recording-reproducing unit are similar to those shown in the references noted. The mechanisms include a backspacing or stepping assembly, as an example, that is operative to step the transducer head along a helical lead screw one track each time it is actuated. This achieves an incremental track-to-track stepping of the transducer. To perform rectilinear scanning of individual tracks as proposed herein, the leadscrew is preferably provided with one tooth and/or valley (groove) associated with each track and is non-helical. That is, the teeth are not arranged in a continuous spiral helix along the length of the lead screw. However, any convenient arrangement can be used for track-to-track stepping, scanning and/or driving of the head and/or record media in relation to one another.

Figure 11:
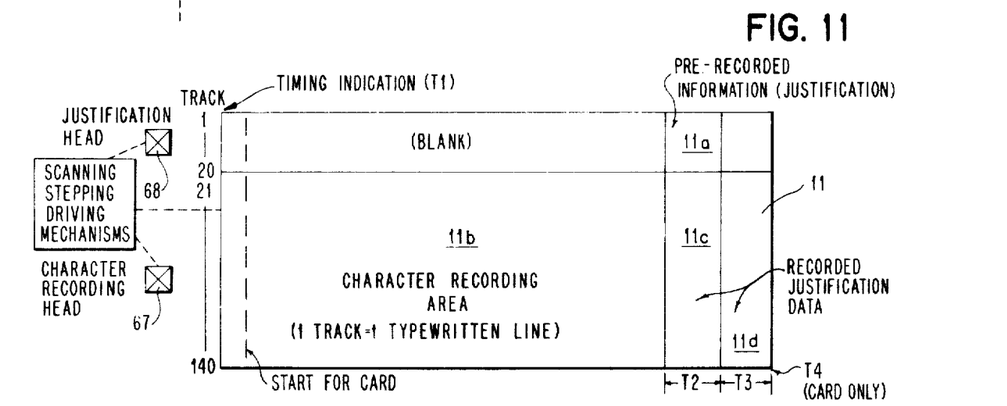
FIG. 11 is a suggested layout for recorded information on a record media in the recording and reproducing unit of FIG. 1.

To accomplish the justification procedures and table lookup presented herein, two head assemblies and associated stepping mechanisms are preferably provided in association with the record media 11, FIG. 11.

Media layout

As shown in FIG. 11, the magnetic belt is assumed to be cut laterally so that its entire periphery is presented for viewing. That is, ordinarily the rightmost extremity of media 11 in FIG. 11 is ordinarily contiguous with and merely a continuation of the leftmost extremity shown in FIG. 11. However, the display of media 11 as shown illustrates that other types of media may be used rather than a belt media with appropriate modification of the media feeding and transducer stepping arrangements in relation to the media. As an example, media 11 in FIG. 11 can represent a magnetic card record media equally as well as a magnetic belt record media.

Media 11 is divided into a number of predefined areas for storing information. Media 11 is assumed to have 140 tracks for storage of information. A portion of tracks 1 to 20 is assigned to the permanent storage of data in table form for use in justifying lines of information. More specifically, section 11a of the belt is set aside for this purpose. Tracks 21 to 140 in section 11b of the belt are set aside for the storage of data related to individual lines of printed information. Preferably, each track in section 11b is associated with a particular type-written line on document 9. Included in sections 11c and 11d of media 11 is an area that is available for the recording of justification data for each of the lines in tracks 21–140. During Single column justification, section 11c ordinarily stores spacebar value information, and section 11d stores long space quantity information. Hence, a line of information in track 21 would ordinarily have the associated justification data stored in a corresponding line 21 in sections 11c and 11d.

Automatic justification with table lookup

The automatic justification procedures that are contemplated by the present invention are particularly discussed in connection with FIGS. 10–14. However, reference will also be made to the other figures, particularly in connection with modifications involved for automatic justification.

It is believed that the operation for accomplishing automatic justification of printed matter according to the present inventive arrangements will be greatly clarified by reference to the following Table of Operations.

TABLE OF OPERATIONS

| Step | Mode and Action | Recorder | Justify Counter Status | | Space Value Dial Status (Ratchet) | Quantity (Long Space) Dial Status (Ratchet) |
|---|---|---|---|---|---|---|
| A | Record. Depress keys. Print and Space. (Subtract 6 for each space prior to End Zone.) | Record data. Also, step Justify head one track for each word space. | 64 −6 ——— 58 −6 ——— 52 | Justify Counter. etc. | 13 | 20 |
| B | Record. Reach End Zone, 64 units remain (Print carrier encounters End Zone Switch). Assume 5 spaces prior to reaching End Zone. | Record data. Also step Justify head to track No. 5. | 64 −30 ——— 34 | (5×6) Total | 3 | 0 |
| C | Record. Depress keys. (Subtract 9 from counter for each space.) (Subtract unit value from counter for characters printed.) | Record data | 34 −34 | | 3 | 0 |
| D | Record. Reach Justify Zone. Counter passes zero. Justify light comes on, notifies operator can terminate line where convenient. | ....do | 0 | (=64) | 3 | 0 |
| E | Record. Assume 13 units of printing and/or spacing into Justify Zone. | ....do | 64 −13 ——— 51 | | 3 | 0 |
| F | Scan-Justify Playback OR Scan-Record Justify Data. Tab or Carrier Return Ends line. Print head tabs or returns. (1) In Side by Side column justification, tab moves print head to right-hand column for immediate Justification-Playback OR (2) Scan-Record Justify Information with associated line. Assume (1), Side by Side. | Switch on Justify head. Read pulses | 51 −34 ——— 17 | Line remainder | 3 | 0 |
| G | Scan. Divide Line Remainder by successive subtractions. | Justify head scans first set of 5 pulses | 17 −5 ——— 12 | | 3 | 0 |
| H | Scan. Ignore First Gap, but Second Gap ratchet Space Dial. | Justify head scans gap | 12 | | 3 +1 ——— 4 | 0 |
| I | Scan. Detect 5 | Justify head scans second set of 5 pulses | 12 −5 ——— 7 | | 4 | |
| J | Scan. Detect Third Gap | Justify head scans gap | 7 | | 4 +1 ——— 5 | 0 |
| K | Scan. Detect 5 | Justify head detects 5 | 7 −5 ——— 2 | | 5 | 0 |
| L | Scan. Detect Fourth Gap | Justify head scans gap | 2 | | 5 +1 ——— 6 | 0 |
| M | Scan. Detect 5. Counter passes through zero. Set Overflow latch. Reverses count direction. | Justify head detects 5 | 2 −2 ——— 0 | 64 −3 ——— 61 | 6 | 0 |
| N | Scan. Detect Gap | Justify head scans gap | | 61 | 6 +1 ——— 7 | 0 |
| O | Scan. Detect 5. Counter again passes zero. Set Remainder latch. | Justify head detects 3 pulses in next group of 5. | | 61 +1 ——— 62 +1 ——— 63 +1 ——— 64=00 | 7 | 0 |

See footnote at end of table.

TABLE OF OPERATIONS—Continued

| Step | Mode and Action | Recorder | Justify Counter Status | Space Value Dial Status (Ratchet) | Quantity (Long Space) Dial Status (Ratchet) |
|---|---|---|---|---|---|
| P | Scan. Increment Quantity (Long Space) Dial number of spaces. | Justify head detects remaining 2 pulses in next group of 5. | 00 +1* 1 +1* 2 | 7 | 0 +1* 1 +1* 2 |
| | | | Space 1 | Space 2  Space 3  Space 4 | Space 5 |
| Q | Playback mode. Justify Space Value and Quantity Dials distribute Remainder as shown. | Standard<br>Distributed Remainder<br>Total Increments | 3<br>4<br>—<br>7 | 3   3   3<br>4   3   3<br>—  —  —<br>7   6   6 | 3<br>3=17<br>—<br>6<br>0 |
| R | End Playback. Reset circuits and mechanisms. | | | | |

[1] Minimum.
[2] Reset.

The table has a number of headings as follows: Step, Mode and Action, Recorder, Justify Counter Status, Space Value Dial Status, Quantity (Long Space) Dial Status. The Table of Operations comprises a number of individual operational steps designated A–R. The mode of the system of FIG. 1 together with the action and various significant components is indicated in the table.

Depression of Record button 61, and Justify button 65, places the equipment in condition for entry of data by keyboard 8, printing of the data in the left-hand column on document 9 and recording of rough copy data on a selected character recording track in section 11b of media 11, FIG. 11. The apparatus is also effective to operate the spacebar dials reset magnet 56 and the zero reset contact 57 to return the dials to the condition shown in FIG. 5.

Of particular significance in the operation of the automatic justification is the counter 70, FIG. 14. Counter 70 is operative during various stages to store justification information and, in connection with the Adder-Subtracter 71, FIG. 14, is effective to operate the space value magnet 55 and quantity magnet 54, FIGS. 9 and 14, in an automatic fashion to subsequently control the playback of recorded information and to justify the same.

Side by side column justification

Figure 13:
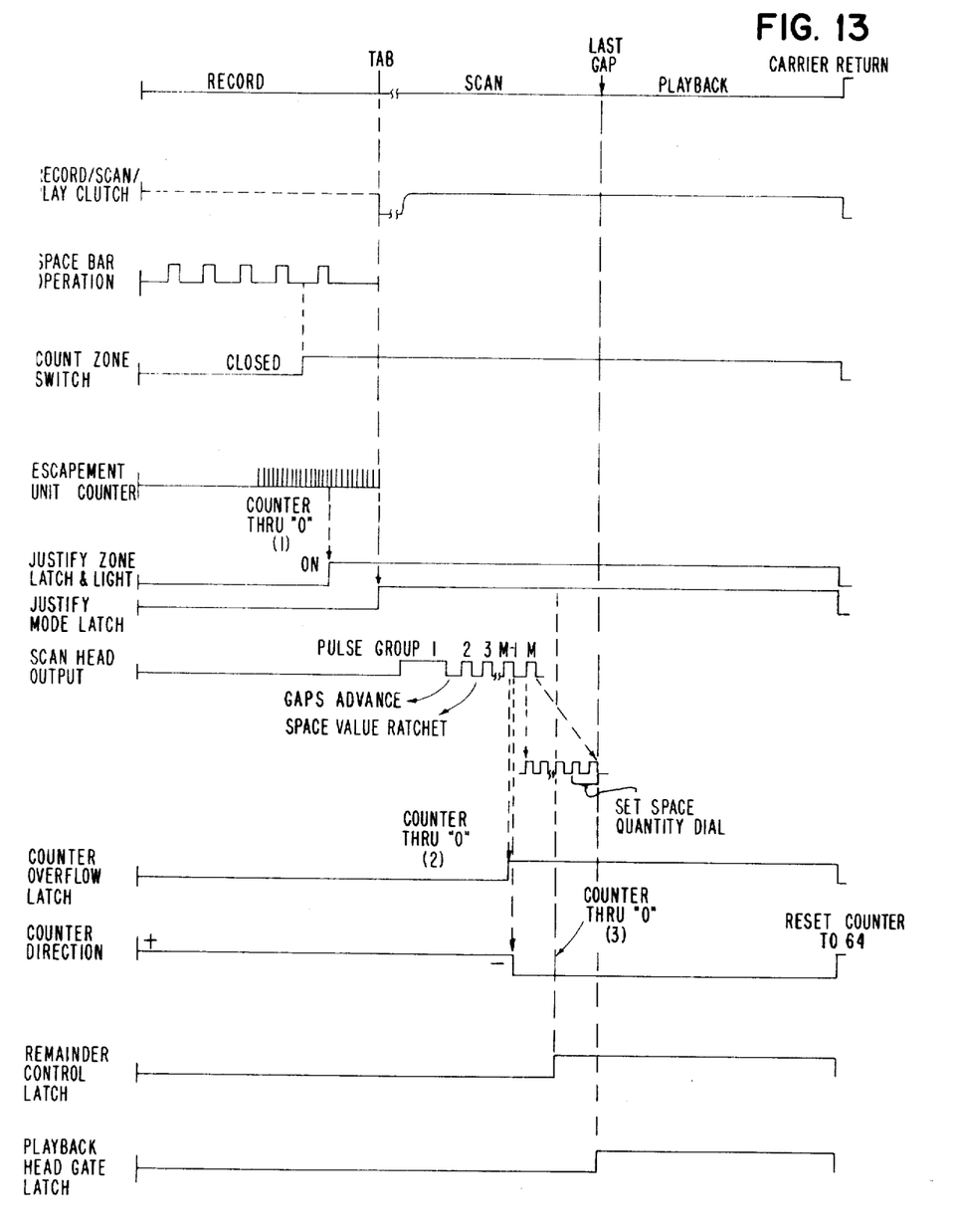
FIG. 13 is a timing chart showing typical entry and justification routines involving Record, Scan, and Playback modes, and referred to as "Side by Side Column" Justification.

The Table of Operations is predicated on an initial typing of rough draft in a line of information on document 9 in the left-hand column with concurrent recording of the data in an associated track in section 11b of the media in FIG. 11. Media 11 is moved incrementally for each character by operation of forward clutch 91 from Character Record circuit 92. Concurrently with the printing of the rough draft line, the circuits of FIG. 14 determine various justification factors that are later used to set the spacebar quantity dial and the spacebar value dial and that, in a sense, perform in an automatic way the functions of the indicator tube assembly previously discussed in FIGS. 2–4. As shown in FIG. 13, the apparatus is operative in a Record mode to record the line of information. Upon termination of the rough draft line, the equipment is placed in a Scan-Justify mode by depression of the tabulation key on composer unit 1, FIG. 1, whereupon automatic justification and arithmetic operations are performed in the circuits of FIG. 14 and the quantity dial 27 and the value dial 26 are set to the proper positions. Subsequently, data stored in the media, FIG. 11, is reproduced during a Playback mode and the line is justified as in the right-hand column in document 9.

Record rough copy

*Step A.*—The Table of Operations will be presented with particular reference to FIGS. 13 and 14. Initially, counter 70 is reset to a status of "64." As indicated, this can occur when the Record and Justify buttons are depressed and it may also occur upon recognition of a Justify Carrier Return operation for print head 10 which indicates the termination of the justified line and the beginning of the next rough copy line. In step A, the mode of the system is "Record." Characters of information are entered through keyboard 8 and printed in the left-hand column on document 9. They are also recorded by recording head 67, FIG. 11. Head 67 is stepped to one of the recording tracks in section 11b by escapement mechanisms similar to those described in the various dictation references. Space operations occurring during the printing of the rough draft line are handled in a special way. For one thing, each time a Space operation occurs, the justification head 68 is stepped one track position by mechanisms that are comparable to those for stepping the recording head 67. Accordingly, if one Space operation occurs during the line, head 68 remains at track 1. If three spaces occur, justification head 68 is stepped to track 3. Five space operations step head 68 to track 5. In this fashion, head 68 performs a table lookup concurrently with the typing of the rough draft in readiness for subsequent justification routines that make use of the information recorded in the justification track selected by stepping of head 68. As shown in FIG. 13, it assumed that five spacebar operations occur in the line in progress.

Each time a Space operation occurs, a unit count of 6 is subtracted from the count of 64 that was initially stored in the Justify Counter 70. The stepping of the justify or scan head 68 and the subtraction of 6 is illustrated in FIG. 14. A Space operation is signaled at terminal 80 and sets the space counter 81 to a count of 6. The subtraction is performed through Or circuit 82 and Adder-Subtracter circuit 71. Since each Space operation subtracts a value of 6, the assumed number of Space operations of 5 subtracts, in this case, a total of 30 from the initial value of 64 in the justify counter, leaving a net of 34 for the line in progress.

Figure 10:
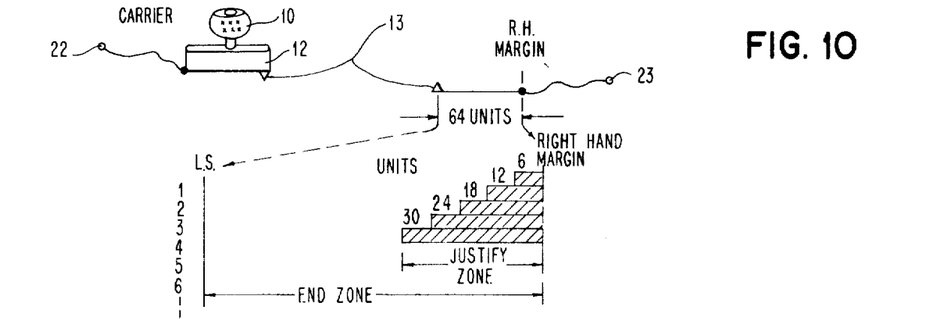
FIG. 10 shows the relationship of the print head in the composer unit of FIG. 1, and End Zone, and a Justify Zone near the right margin of printing.

*Step B.*—As best seen in FIGS. 1 and 10, print head 10 is mounted on a carrier 14 for movement during the printing of characters and during Space operations. When carrier 14 reaches a position that is 64 units from the right-hand margin, FIG. 10, an End Zone Switch 13 is closed to indicate this fact. Potential at terminal 22 is then directed to terminal 23 for controlling the circuit in FIG. 14. The 64 unit area at the end of the printed line is termed the "End Zone." The potential is applied at terminal 23, FIG. 14 and gates one input of an And circuit 83. The End Zone switch could also be operated by a cam carried by the print head carrier.

*Step C.*—Following the gating of And circuit 83, any further characters that are printed and any further Space operations establish unit counts that are subtracted from counter 70. These unit counts are derived from the photosensing assembly 39 as disc 38 rotates in synchronism with the setting of the pins in assembly 30, FIG. 7. The count impulses are applied through Or circuit 82, Adder-Subtracter 71, and are effectively subtracted from counter 70. It should be noted that during this interval, any Space operation effects a subtraction of 9 units from counter 70.

*Step D.*—Counter 70 is a ring type counter which counts forward or reverse and provides a signal whenever it passes "0" in either direction. For the present purpose, the direction of counting of counter 70 is not too significant, but the quantity stored therein is the controlling factor in the justification procedures. The "0" status of counter 70 is reflected through And circuit 84, and through And circuit 96 in conjunction with the End Zone switch (terminal 23), FIG. 14, to set a Justify Zone latch 85 and to energize a Justify Zone lamp 86 on composer unit.

The reader will note that the space value dial and the quantity dial remain at their initial settings of "3" and "0," respectively.

The lighting of the Justify Zone lamp on printer 1 indicates to the operator that the present line may be terminated at some convenient place and that the remainder can readily be distributed among the spacebar operations in order to justify the line. The "0" setting of counter 70 corresponds to the beginning of the justify zone in FIG. 10.

*Step E.*—Printing and/or spacing continues into the justify zone until the line is terminated by the operator. It is assumed for purposes of illustration in the Table of Operations that 13 units of printing and/or spacing occur in the present line. Counter 70 is stepped by unit signals so that it stores a count of 51 representing the complement of the extent of penetration into the justify zone (64—13=51).

*Step F.*—Upon termination of the line in progress, the operator depresses the Tab keybutton on keyboard 8 of composer unit 1 to effect motion of print head 10 to the beginning of the rightmost column of document 9. A Tab code is recorded on belt 11. This effectively ends the "rough copy" line and further establishes routines according to FIG. 13 which place the apparatus in a Scan mode to determine the justification factors for the line involved.

Scan-justify mode

To simplify the presentation, it is assumed that the equipment goes directly into a Scan-Justify mode and subsequently into a Playback mode for the line just completed to accomplish a Side by Side column justification.

Figures 12, 15:
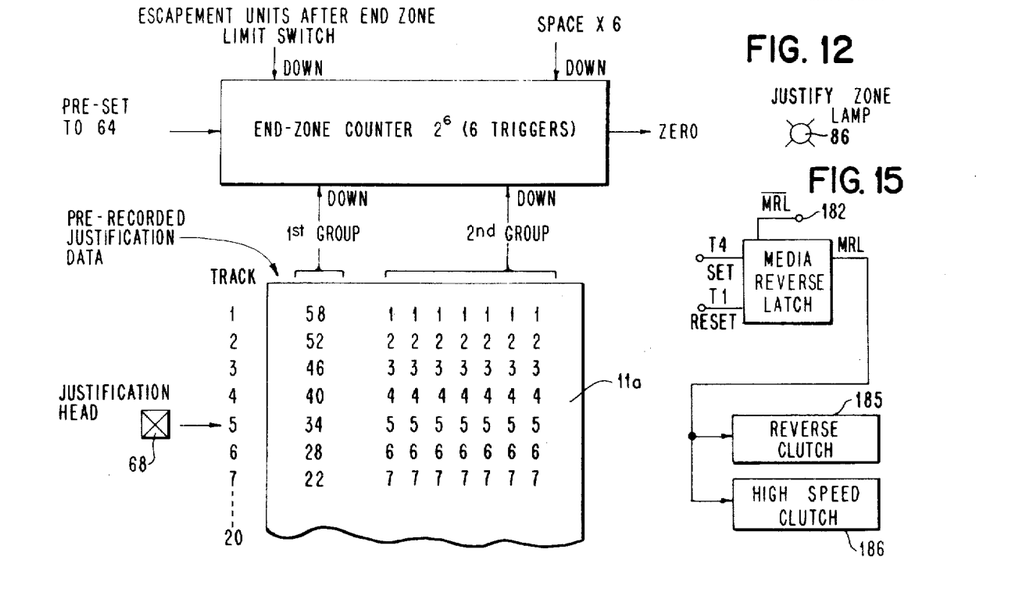
FIG. 12 illustrates justification tables that are permanently stored in the system, and in the assumed case on the record media of FIG. 11, tracks 1–20.
FIG. 15 illustrates additional circuitry for processing a unitary document, such as a magnetic record card.

The Tab signal to terminal 88, FIG. 14, together with the End Zone Switch Condition gates And circuit 89 and sets a Justify Mode latch 90 to control subsequent operations. The output of And circuit 89 also energizes the forward clutch mechanism 91 to move media 11. Head 68 now scans the recorded justification signals in track 5. Referring to FIG. 12, the values stored in track 5 consist of a first group of signals or coded representations representing a value of "34." This is separated by a gap and subsequently in track 5 are recorded a series of values representing individual factors of "5," each separated from the succeeding factor by a gap that is recognizable during scanning by head 68 in track 5.

The factor "34" sensed by head 68 is applied at terminal 94, FIG. 14, and passes through And circuit 95, Or circuit 82, and Adder-Subtracter 71 together with the count stored in Justify counter 70 to derive a value in counter 70 that represents the line remainder. Counter 70 previously stored 51 and, with the factor 34 subtracted, now stores a count of 17 which indicates a line remainder value of 17.

*Step G.*—The apparatus is now operative to divide the line remainder in order to develop the values required for the setting of the value dial 26 and the quantity dial 27, FIGS. 5 and 6. The division is effected by a series of subtractions from the value in the justify counter. Accordingly, the first factor "5" is sensed by head 68, applied to terminal 94, FIG. 14, and subtracted from the value in counter 70 of "17," resulting in a new value of "12."

*Step H.*—The circuits of FIG. 14 are provided with a gap detector 100 that senses the gaps between the succeeding factors "5" in order to automatically energize the space value ratchet magnet 55, FIGS. 14 and 9. The first gap between the factor "34" and the factor "5" is ignored due to the setting of a gap latch 101 which degates And circuit 102. All other gaps subsequently sensed are provided through And circuit 102 to step magnet 55 and to move the spacebar value dial 26 one space each time magnet 55 is energized.

The action is illustrated during the scan interval, FIG. 13. By reference to the Table of Operations, it is seen that the space value dial now has a setting of "4."

*Step I.*—The next factor "5" is sensed in track 5 and is subtracted from the value "12" in counter 70 for a result of "7."

*Step J.*—The third gap in track 5 is sensed by head 68 and through the And circuit 102, previously discussed, again steps the space value ratchet by energizing magnet 55. The space value now has a setting of "5."

*Step K.*—The third factor "5" is sensed by head 68 and subtracted from the contents "7" of counter 70 resulting in a value of "2."

*Step L.*—The fourth gap in track 5 is sensed by head 68 and applied through the circuits discussed to step the space value dial to a new setting of "6."

*Step M.*—Sensing of the next factor "5" by head 68 steps counter 70 to a value of "61," during which counter 70 passes through the all zero condition. Counter 70 stores a count of "61." With the apparatus in a Justify mode as indicated by latch 90, FIG. 14, being set, the "Justify mode" input at terminal 105 is up to And circuit 106. When counter 70 passes through "0," And circuit 84 provides another input to And circuit 106 which then supplies an output to set the Counter Overflow latch 107. One output from latch 107 gates an input of And circuit 108 and the same output from terminal 109 gates And circuit 110.

*Step N.*—Detection of the next succeeding gap in track 5 by head 68 completes the gating of And circuit 110 to reverse the count direction controlled by line 112 to Adder 71 and again steps the space value dial 26 by energizing magnet 55, FIGS. 9 and 14. The justify counter status is "61."

*Step O.*—Head 68 now senses the pulses in the next factor "5." With Adder-Subtractor 71 reversed by line 112, the first 3 pulses are effectively added to the count of 61 in counter 70 resulting in a status of "64" which is the same as "0."

As counter 70 passes through the "0" state, And circuit 84 is again gated and provides a gating signal to And circuit 106. The output of And circuit 106 to And circuit 108 in connection with the previously established output from latch 107 sets the Remainder Control latch 115. The output of latch 115 is supplied to two And circuits 116, and 117.

*Step P.*—The purpose of the circuit actions in Step P is to step the quantity (Long Space) dial 27 in order to establish how many spaces are to be performed during subequent printing of the line involved at the higher space value of "7" that was established during Step N. Accordingly, the two remaining pulses in the factor "5" are added to counter 70 and at the same time applied by line 120 to gate And circuit 116. And circuit 116 provides an output through a buffer circuit 150 to energize magnet 54 which, with reference to FIG. 9, steps the quantity dial 27 one index position. The next pulse in the factor "5" is again provided by line 120 and again energizes magnet 54 to step quantity dial 27.

No further pulses are available in the factor "5" that has just been sensed and therefore, the spacebar quantity dial is finally set at "2" in readiness for the justification procedures.

To summarize, the space value dial is at a setting of "7" and the spacebar quantity dial is at a setting of "2."

*Step Q.*—Upon detection of the gap following the factor "5" just used, And circuit 117 is gated by line 122 and with latch 115 set provides an output to set the Playback Latch 124. This continues the energization of clutch 91.

In FIG. 13, setting of the Playback latch establishes a Playback mode in the equipment wherein the rough copy data recorded during the Record mode is sensed and provided to composer unit 1 for printing in the right-hand column on document 9.

As set forth in the Table of Operation for Step Q, the first two spaces in the line will have an incremental value of 7 units each. When the spacebar operation number 2 is completed, the quantity dial 27 moves to "0" and concurrently moves the space value dial 26 to a setting of "6" as described in connection with the manual and visual justification procedures.

Therefore, the three remaining spaces are performed with an incremental value of "6" units each.

By the foregoing procedures, the remainder of "17" in the line is distributed over the five spaces and the line is justified.

Step R.—Printing of characters and spacing continues until the previously recorded Tab code at the end of the rough copy data is recognized. The Tab signal at terminal 131, FIG. 14, together with the Playpeck signal at terminal 130 that indicates a Playbeck mode is applied to gate And circuit 132. The output of And circuit 132 represents a Justify Carrier Return indication that effects a Carrier Return operation on the composer unit 1 by a signal from termnal 133. The justify Carrier Return signal from And circuit 132 is also applied to reset the space value dial reset magnet, FIG. 6, and by line 134 to perform other reset functions. The reset operations include the following. All latches are reset at this time, except Playback latch 124. The Justify Head is reset to track "0." The magnetic recording and reproducing head is stepped to the next track on media 11. Adder 71 is reset to the subtract mode in rediness for arithmetic operations required for the rough copy of the next line. Also, at this time the Justify Counter 70 is reset to 64 (00).

The continued set condition of Playback latch 124 operates forward clutch 91 to continue the movement of media 11 past the magnetic head 67. As soon as the beginning of media 11 is recognized, as by a timing indication T1, a signal is applied by terminal 135. FIG. 14, to reset Playback latch 124. This drops forward clutch 91 and record media 11 is positioned in readiness for the typing of rough copy in the next line on document 9.

Single column justification

In the assumed example shown in the Table of Operations, only a single line of data is recored on media 11, a Scan mode is then initiated to establish the proper justification information for the line, and the data is then sensed and immediately printed in the right-hand column on document 9.

As an alternative, however, a Single Column Justification (or Scan Record) mode can be established wherein justification factors in section 11a on media 11, FIGS. 11 and 12, are read in the spacebar track selected during printing of the line and are concurrently recorded in sections 11c and 11d on the media in association with the line just completed. The latter type of operation results in the recording of all lines or a plurality of lines for a document, such as document 9, FIG. 1, with each line having associated justification information stored with it for use at a latter time. Upon completion of the recording of all lines and the associated justification information, the apparatus can subsequently be placed in a Playback mode by depression of button 62, FIG. 1, whereupon the data for each line, together with its justification information, is sensed and the entire document printed back on composer unit 1 automatically and in its entirety.

Figure 16:
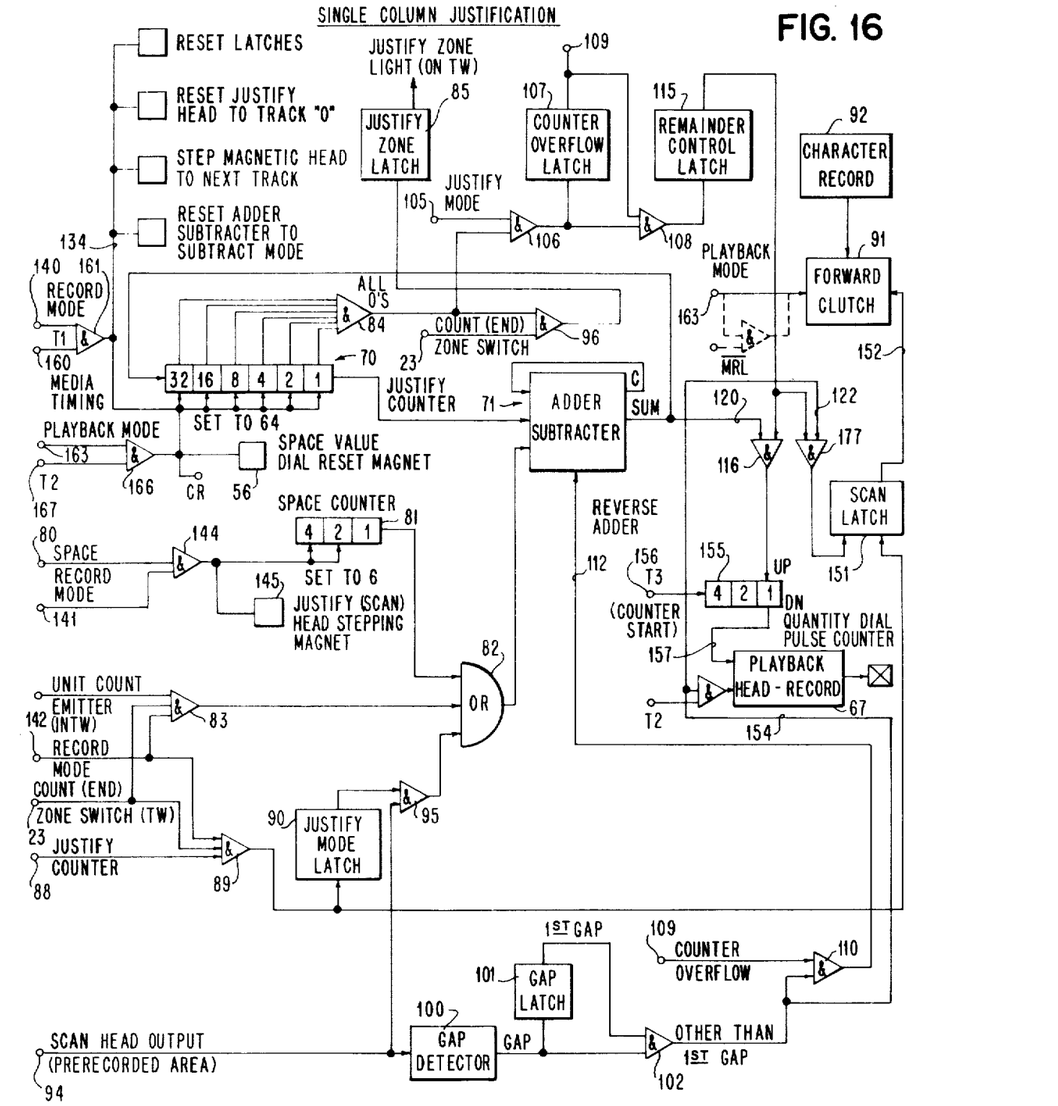
FIG. 16 is a circuit diagram that is similar to the circuit in FIG. 14, but which is directed to "Single Column" Justification procedures.

FIG. 16 shows the circuits that are provided for Single Column justification. The circuit makes use of most of the components previously shown in FIG. 14. Where this is the case, corresponding reference numerals are used.

Depression of record button 61, FIG. 1, provides Record mode signals to terminals 140, 141, and 142. The space signals at terminal 80, with the Record mode signal at terminal 141, conditions And circuit 144 to provide setting impulses to space counter 81 and to step the Justify Head stepping magnet 145. This is comparable to the counting of space increments that occurred during the Side by Side column justification in FIG. 14. Forward clutch 91 is energized to move media 11 past the record head under control of the Character Record circuit 92 as previously described.

Recording of characters and spaces in the selected track on media 11, which is assumed to be track 21, continues until print head carrier 12 reaches the End Zone to supply an End Zone signal at terminal 23. The operator continues to type characters and to space in the End Zone. The unit count emitter input to And circuit 83 together with the End Zone and Record mode inputs conditions And circuit 83 to subtract escapement values for each character encountered in the End Zone through Or circuit 82 and Adder-Subtracter 71. During this time Space characters are counted as nine increments. The "0" condition of Justify counter 70 is combined with the End Zone indication to condition And circuit 96 and set the Justify Zone latch 85. This energizes the Justify Zone lamp 86 to inform the operator that the line can be terminated at any convenient place. This action is comparable to Step D in the Table of Operations previously described.

When printing is completed, the operator depresses a Justify Carrier Return keybutton which supplies a signal to terminal 88 and, with the other conditions shown, And circuit 89 sets Justify Mode latch 90. The output by line 150 also sets a Scan latch 151. This activates forward clutch 91 by line 152.

Scan and record mode

Reference is made to FIG. 11 which shows a number of circuit breaker impulses desginated T1, T2, T3, and T4. Signal T1 indicates the beginning of the tracks in media 11. Circuit breaker T2 is closed while scanning proceeds in sections 11a and 11c on the media. Circuit breaker T3 is closed while scanning of section 11d on media 11 proceeds. Circuit breaker T4 gives a timing pulse at the end of section 11d, and is provided with the card embodiment to be discussed.

The objective of the present justification mode is to record justification data in association with the rough copy data just completed. For convenience in Playback, it is preferable that the justification data be recorded in the assigned areas 11c and 11d in the same track as the rough copy data with which it is associated.

With Scan latch 151 set, signals are provided from the scan head 68 to terminal 94 as in the previous embodiment. The signals are applied through And circuit 95, Or circuit 82, and Adder-Subtracter 71, to step Justify Counter 70 in a manner comparable to that described in connection with Side by Side column justification. Also, the signals are applied through the gap detection circuits near the bottom of FIG. 16. However, in the present mode of operation, the signals derived from scan head 68 are applied to the recording head 67 concurrently with sensing so that they are recorded in sections 11c and 11d in association with the line of data just completed.

Arithmetic operations performed during Single Column justification are comparable to those performed during the Side by Side column justification with the main difference being that the results of the arithmetic operations are recorded on the media rather than operating the space value and quantity dials immediately and directly as in the Side by Side column justification. The gaps, other than the first gap, are recognized and a signal for each gap is applied by line 154 to the record head 67, as determined by the justification track that was selected during recognition of space operations during the printing of the rough copy. Counter Overflow latch 107 sets as before when counter 70 passes through the "0" state. This conditions And circuit 110 so that the next gap reverses the mode of Adder-Subtracter 71 by line 112. The pulses are counted in the reverse direction with counter 70 again passing through zero. This conditions And circuit 108, and sets Remainder Control latch 115, which, in turn, conditions And circuits 116 and 117. The balance of pulses in the group then passes by line 120 and through And circuit 116 to counter 155, where they are accumulated. Counter 155 stores the remainder, that is the quantity of long spaces required, until time T3 which corresponds to section 11d in media 11. At this time, a gating signal to terminal 156 steps counter 155 and provides impulses by line 157 for recording by head 67 in section 11d.

Scan latch 151 remains set to energize forward clutch 91 until the timing indication is reached on media 11.

The Record mode input at terminal 140 together with the T1 input at terminal 160 conditions And circuit 161 which resets all latches, resets the justify head to track "0," steps the magnetic head to the next track, resets Adder-Subtracter 71 to the Subtract mode, sets counter 70 to a "0," and resets the space value and quantity dial magnets 56. The latter resetting action is of no consequence at this time, since the space dials are assumed not to have been previously operated.

Recording of characters and justification data continues in the manner described until the end of the rough copy, as required by the operator.

Playback mode for single column justification

It is now assumed that the recording of the rough copy and associated justification data has been completed and that the operator desires to playback the information in a justified form. In order to do this, it is first necessary to gain access to the justification data of an individual line before the data in that line is reproduced for printing.

The operator depresses Playback keybutton 62, FIG. 1, to initiate the Playback operation. In the Playback mode, head 67 is placed in track 20 which is blank until it reaches section 11a. The Playback mode signals are applied to terminals 162 and 163. As soon as the T2 circuit breaker closes, which indicates the beginning of sections 11a and 11c on media 11, a signal to terminal 163 and terminal 167 conditions And circuit 166 to step head 67 to the next track which is track 21. The And circuit 166 output resets all of the various circuits and mechanisms by line 134.

Figure 17:
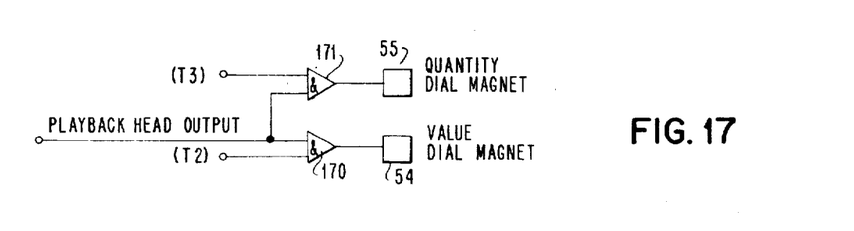
FIG. 17 illustrates a value and quantity setting circuit that is used in the "Single Column" mode.

Referring to FIG. 17 the spacebar value signals stored in section 11c track 21, are applied through And circuit 170 to step the value dial 26 by operation of the value dial magnet 54. At time T3, And circuit 171 is conditioned and quantity dial 27 is stepped by energization of the quantity dial magnet 55. With the assumption that media 11 is a magnetic belt, the belt is moved around until the circuit breaker timing indication T1 exists. The apparatus remains in a Playback mode and forward clutch 91 continues to be energized by line 163. The rough copy data is now sensed in track 21 and printing of the characters stored in the track proceeds in a manner comparable to that which occurred during playback of the information in a Side by Side column Justification mode. Accordingly, the value dial 26 and quantity dial 27 control the operation of composer unit 1 to produce a justified line of copy for the data in track 21.

At the end of the line of rough copy data, head 67 senses timing mark T2 which is applied to And circuit 166 to step head 67 in order that the justification data for track 22 may now be sensed and applied to the value and quantity magnets as before in readiness for the sensing of the recorded data in track 22. The resetting and timing situations encountered for track 22 are comparable to those that occurred during the playback of the data in track 21.

Justification procedures with magnetic card record media

The Table Lookup techniques disclosed herein are adaptable for use with a magnetic media rather than a magnetic belt media.

Reference is made to the Jones et al., application Ser. No. 623,022 and the 1967 Kolpek application Ser. No. 623,053 for suitable magnetic card recording and reproducing equipment that could be incorporated in the table lookup environment of the present invention.

In FIG. 11, the T4 circuit breaker indication is available when a card processing unit of the type described in the Jones et al., and 1967 Kolpek applications is contemplated. A few changes are made to the Side by Side column justification circuit of FIG. 14 and the Single Column justification circuit of FIG. 16 in order to accommodate card processing. Also, a separate Scan head is provided for the Table Lookup scanning.

In FIG. 15, a Media Reverse latch controls a reverse clutch and high speed clutch as more particularly described in the Kolpek application. Since a magnetic belt media 11 is continuous in nature, scanning of the data stored on the media is also performed in a continuous manner around the periphery of the belt. A magnetic card media on the other hand, is non-continuous and modifications are required in order to record data on the card including justification data derived from a prerecorded table, such as that stored in section 11a, FIG. 11.

Considering first the Side by Side column justification of FIG. 14, And circuit 180 is added. The playback latch 124 output is routed by line 181 to forward clutch 91 rather than by line 98 as before. During recording, clutch 91 is actuated in an incremental fashion under control of the Character Record block 92, as before. During Playback, on the other hand, the Playback latch output through And circuit 180 is dependent upon a Not MRL input to terminal 182. This is available from the Media Reverse latch, FIG. 15. In a card environment, the sensing of time T4 at the end of the card sets the Media Reverse latch. The Media Reverse latch output (MRL) actuates a reverse clutch 185 and high speed clutch 186, FIG. 15, to effect a high speed reversal of movement of card 11 in order to reach the beginning of the tracks of data. With the Media Reverse latch set, the Not MRL input to And circuit 180 is down and forward clutch 91 is degated. The Media Reverse latch is reset upon recognition of the timing indication T1 that corresponds to the beginning of the record card. Thereupon, Not MRL rises, And circuit 180 becomes conditioned, and forward clutch 91 is operated to produce relative movement between card 11 and the heads 67 and 68, as appropriate, to derive previously recorded rough copy data or justification data, as appropriate.

Alternatives

A number of alternative techniques may be used. One alternative in the present inventive arrangements is to provide the table of justification factors in a place separate from the media for scanning by head 68. Thus a separate magnetic card or belt or other media or memory device can be incorporated in the system for permanent retention of the justification data.

As another alternative, it may be appropriate under some circumstances to make use of only a single line or track on the record media 11 and to degate the stepping of the magnetic recording and reproducing head 67. In this event, a single line of rough copy data is recorded in the track selected with or without justification data, depending upon the mode of operation of the equipment. Upon termination of the Playback mode involving the line of data just recorded, a new line of rough copy data is recorded in the same track with erasure of the previous data.

With the foregoing arrangement, it may be possible in one mode to record only a single line of rough copy data in a predetermined track on the media with each successive line being recorded in the same track, and it is also possible to record a multiplicity of lines, each in its own individual track and each having its own justification data, as in a Single Column justification mode. As taught in the Jones et al. application, it is also possible to have both a Side by Side justification mode and a Single Column justification mode in the same apparatus by suitable switching of the circuits. This entails the combining of the additional circuitry shown in FIG. 16 with the basic circuitry of FIG. 14 and the incorporation of relay switching or other switching to change from one kind of justification mode to the other.

The apparatus is adaptable to handle other composition functions, such as centering and flush right, or flush left-flush right combinations. Suitable switching is provided to establish the desired composing operation. The media has a plurality of prerecorded tables that are individually selected depending on the composition mode. These tables have values other than those described. As an example, in centering a line of text with a line remainder of "17," factors are stored to divide the 17 by a factor of "2" to initiate Space operations prior to printing and establish balanced white space on the left and right ends of the line.

It is apparent that the present inventive arrangements provide for either the manual justification of data or the automatic justification of data in a simplified and efficient manner. The system makes use of a minimum amount of hardware to achieve its objectives.

While the invention has been particularly shown and described with reference to a preferred embodiment, it will be understood by those skilled in the art that various changes in form and detail may be made without departing from the spirit and scope of the invention.

What is claimed is:

1. Composing apparatus for producing standard categories of information, such as printed lines of data, conforming to a predetermined standard category length, comprising:
   a source supplying data signals representative of characters and composing criteria such as interword spaces, arranged in individual rough copy categories, such as lines;
   retaining means including a unitary storage means having at least a first portion for storing data signals from said source and a second portion for storing a plurality of arithmetic factor sets in an accessible table form and related to said composing criteria;
   data entry means operative to enter a rough copy category of data signals in said data portion of said storage means;
   arithmetic means for comparing an individual rough copy category, with said standard category, said arithmetic means including means providing remainder signals indicative of the extent by which a said rough copy category differs from said standard category;
   scanning means;
   positioning means responsive to said composing criteria signals and operative concurrently as said criteria signals are supplied from said source for positioning said scanning means in accessing relation with a selected arithmetic factor set in said second portion of said storage means;
   and means operable following completion of entry of a rough copy category for relatively moving said scanning means and said storage means to supply factor signals representative of said selected arithmetic factor set to said arithmetic means for use during processing of said rough copy category.

2. The apparatus of claim 1, wherein:
said source of data signals is an operator keyboard; and wherein
said retaining means is a magnetic recording unit.

3. The apparatus of claim 1, wherein:
said source includes means for supplying data signals representative of informational and functional characters including interword spaces; and wherein
said positioning means includes means to access an arithmetic factor set that is dependent upon the quantity of said interword spaces.

4. The apparatus of claim 3, wherein:
said retaining means comprises a magnetic storage unit having facilities for recording and reproducing signals and including an assigned area for storing said arithmetic factor sets; and further comprising
a first scanning means in said storage unit for recording and reproducing informational and functional signals; and
a second scanning means in said storage unit for accessing and reproducing a required arithmetic factor set, said second scanning means being controlled in response to signals representative of the number of interword spaces encountered during said rough copy procedures.

5. The apparatus of claim 4, wherein:
said functional and informational signals are stored on a magnetic record media; and wherein
said arithmetic factor sets are stored on said same magnetic record media; and wherein
said first and second scaning means comprise recording and reproducing transducers and associated scanning mechanisms.

6. The apparatus of claim 5, further comprising:
means to operate said first scanning means to record rough copy signals, to thereafter operate said second scanning means to reproduce said arithmetic factor sets, as selected, and to thereafter operate said first scanning means to again reproduce said rough copy signals for supplying the same to a utilization device.

7. Apparatus of claim 6, wherein:
said utilization device is a printing composer unit operative in response to justification factors determined by said arithmetic means and to said reproduced signals to produce justified copy.

8. The apparatus of claim 1, further comprising:
a utilization device; and
means for reproducing said retained data signals and supplying the same to said utilization device.

9. The apparatus of claim 8, further comprising:
means for establishing a first mode termed Side by Side column justification;
means operable during said first mode for supplying said data signals to said retaining means during a rough copy entry procedure, determining justification requirements of the rough copy category, and reproducing said retained signals while controlling said utilization device to produce justified copy in accordance with the determined justification criteria;
means for establishing a second mode termed Single Column justification; and
means operable during said second mode for supplying data signals from said source to said retaining means during rough copy entry procedures, determining justification values required for individual rough copy categories, and supplying said justification factors for storage by said retaining means in association with said individual categories and for reproduction at a later time.

10. The apparatus of claim 9, wherein:
said retaining means is a magnetic storage unit having facilities for recording and reproducing data signals in a media such as a magnetic card or magnetic belt.

11. The apparatus of claim 10, further comprising:

means for storing justification data in association with said informational and functional characters in an additional portion of said magnetic media.

12. The apparatus of claim 8, wherein:
said utilization device is a printing composer unit having facilities for printing characters and performing functions in response to said reproduced signals.

13. The apparatus of claim 12, further comprising:
means for establishing a number of composing modes of operation including Side by Side column justification, Single Column justification, Centering, Flush Right, Flush Left, and combinations of the foregoing.

14. The apparatus of claim 12, further comprising:
means operative as informational and functional characters are entered to store escapement values of said characters for subsequent use in revision procedures; and
means associated with said escapement value storage means for supplying escapement value indications to said arithmetic means in order to develop justification factors for said information categories.

15. The apparatus of claim 14, wherein:
said escapement value storage means comprises a pin wheel assembly settable to store escapement value representations; and wherein
said supplying means associated therewith is a photosensing means.

16. The apparatus of claim 12, wherein:
said retaining means and reproducing means is a unitary magnetic storage unit having facilities for recording and reproducing data signals; and further comprising
means for establishing a first mode of operation during which rough copy signals are recorded along with justification factors determined by said arithmetic means, and a second mode of operation during which said signals are reproduced for transmission, and
telecommunication facilities for utilizing said reproduced signals.

17. The apparatus of claim 16, further comprising:
means operative in a Local mode to establish a sub-mode wherein said printing composer is interconnected with said magnetic storage unit for the recording and reproduction of data signals to produce justified copy, and another sub-mode wherein said printing composer and said magnetic storage unit are operable separately; and further comprising
means interconnected with said magnetic storage unit for controlling the same to record and reproduce audio signals.

18. The apparatus of claim 12, further comprising:
means for relatively escaping said printing facilities during printing of characters and establishing of interword spaces;
and means in said printing composer unit settable under control of said arithmetic means for controlling said escaping means to establish spacebar values and quantities required to produce justified copy.

19. The apparatus of claim 18, wherein:
said arithmetic means comprises a plurality of counters, registers, an adder-subtracter circuit, and associated control latches for developing line remainders, determining justification factors such as interword space quantities and values; and
logical circuit means for controlling said settable spacebar value and quantity means in accordance with justification signals supplied by said arithmetic means.

20. The apparatus of claim 18, further comprising:
means controlled by said arithmetic means for setting said settable spacebar value and quantity means for producing justified copy during the reproduction of said retained signals.

21. The apparatus of claim 18, further comprising:
means for establishing a first mode of operation wherein said settable spacebar value and quantity means are manually manipulated by an operator and a second mode of operation wherein said spacebar value and quantity means are automatically manipulated under control of said arithmetic means.

22. The apparatus of claim 21, wherein:
said printing composer includes a keyboard for operator entry of rough copy data; and further comprising
a visual indicator assembly operable during entry of rough copy to indicate to an operator the required settings of said spacebar value and quantity means.

23. The apparatus of claim 21, wherein:
said spacebar value and quantity means comprises a plurality of settable dials and associated indicators providing a visual indication of the setting of said dials.

References Cited

UNITED STATES PATENTS

| | | | |
|---|---|---|---|
| 2,379,862 | 7/1945 | Bush | 197—84.1 |
| 2,632,548 | 3/1953 | Ackerman | 197—84.1 X |
| 2,678,713 | 5/1954 | Higonnet et al. | 197—84.1 |
| 2,848,049 | 8/1958 | Robbins et al. | 197—20 X |
| 2,968,383 | 1/1961 | Higonnet et al. | 197—20 |
| 2,971,626 | 2/1961 | Dirks | 197—84.1 |
| 3,141,395 | 7/1964 | O'Brien | 197—20 X |
| 3,205,996 | 9/1965 | Greenwood | 197—84.1 |
| 3,332,617 | 7/1967 | Higonnet et al. | 197—84 X |
| 3,333,668 | 8/1967 | Sausele | 197—84 X |

PAUL J. HENON, Primary Examiner

P. R. WOODS, Assistant Examiner

U.S. Cl. X.R.

197—19, 20, 84